United States Patent
Vande Haar et al.

(10) Patent No.: US 11,872,885 B2
(45) Date of Patent: Jan. 16, 2024

(54) TRAILING VEHICLE TRACTION CONTROL SYSTEM WITH FORCE INCREASE CONTROL

(71) Applicant: DEERE & COMPANY, Moline, IL (US)

(72) Inventors: William J Vande Haar, Janesville, IA (US); Gary Keys, II, Cedar Falls, IA (US); Joe L Schutte, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 259 days.

(21) Appl. No.: 16/986,684

(22) Filed: Aug. 6, 2020

(65) Prior Publication Data

US 2021/0129670 A1     May 6, 2021

Related U.S. Application Data

(60) Provisional application No. 62/928,940, filed on Oct. 31, 2019.

(51) Int. Cl.
| | |
|---|---|
| *B60K 28/16* | (2006.01) |
| *B60T 8/175* | (2006.01) |
| *B60W 30/18* | (2012.01) |

(52) U.S. Cl.
CPC ............. *B60K 28/165* (2013.01); *B60T 8/175* (2013.01); *B60W 30/18172* (2013.01)

(58) Field of Classification Search
CPC ............ B60K 28/165; B60K 2001/001; B60K 6/448; B60K 6/52; B60K 1/00;
(Continued)

(56) References Cited

U.S. PATENT DOCUMENTS

| | | | | |
|---|---|---|---|---|
| 3,780,819 | A * | 12/1973 | Coordes | B62D 53/04 |
| | | | | 477/203 |
| 4,331,226 | A * | 5/1982 | Heidemeyer | B60W 10/06 |
| | | | | 192/96 |

(Continued)

FOREIGN PATENT DOCUMENTS

| | | |
|---|---|---|
| DE | 102007057655 A1 | 6/2009 |
| DE | 102016010575 A1 | 3/2018 |

(Continued)

OTHER PUBLICATIONS

Mckinzie et al., Power Control System with Transmission Transient Boost Function, U.S. Appl. No. 16/670,210, filed Oct. 31, 2019, 37 pages (specification and drawings).

(Continued)

*Primary Examiner* — Vivek D Koppikar
*Assistant Examiner* — Dominick Mulder (57) ABSTRACT

A traction control system for a trailing vehicle includes an electric machine, a ground engaging apparatus in contact with a ground surface, a speed sensor measuring the speed of the ground engaging apparatus, and a controller providing a traction control signal to the electric machine. The controller is in communication with a force increase control. The controller provides a temporary increase in tractive force of the electric machine when the force increase control is activated either manually or automatically. The amount of temporary increase in the tractive force can be variable and adjustable.

23 Claims, 8 Drawing Sheets

(58) Field of Classification Search
CPC .. B60T 8/175; B60T 2270/303; B60T 8/1708; B60W 30/18172; B60W 50/082; B60W 20/40; B60W 2300/14; B60W 2520/26; B60W 2540/215; B60W 2552/15; B60W 2710/083; B62D 59/04; B60Y 2200/22; Y02T 10/62
USPC .......................................................... 701/82
See application file for complete search history.

(56) References Cited

U.S. PATENT DOCUMENTS

| | | | | |
|---|---|---|---|---|
| 6,151,537 | A * | 11/2000 | Gheordunescu | G01L 5/13 296/13 |
| 8,469,125 | B2 * | 6/2013 | Yu | B62D 15/027 280/448 |
| 8,544,574 | B2 | 10/2013 | Fegley et al. | |
| 9,037,346 | B2 | 5/2015 | Keys, II et al. | |
| 9,227,525 | B2 | 1/2016 | Fleege et al. | |
| 9,228,322 | B2 | 1/2016 | Keys, II et al. | |
| 9,562,592 | B2 | 2/2017 | Rekow et al. | |
| 9,694,712 | B2 | 7/2017 | Healy | |
| 10,099,736 | B2 | 10/2018 | Gugel et al. | |
| 10,183,661 | B2 | 1/2019 | Burjes | |
| 10,245,972 | B2 | 4/2019 | Healy et al. | |
| 10,500,975 | B1 | 12/2019 | Healy | |
| 10,596,913 | B2 | 3/2020 | Healy et al. | |
| 10,647,193 | B2 | 5/2020 | McKinzie et al. | |
| 10,654,354 | B2 | 5/2020 | Hössle et al. | |
| 10,766,478 | B2 | 9/2020 | Healy et al. | |
| 10,821,853 | B2 | 11/2020 | Healy et al. | |
| 10,889,288 | B2 | 1/2021 | Richter et al. | |
| 11,046,192 | B2 | 6/2021 | Aufdencamp | |
| 11,046,302 | B2 | 6/2021 | Richter et al. | |
| 11,052,769 | B2 | 7/2021 | Vande Haar et al. | |
| 11,094,988 | B2 | 8/2021 | Richter et al. | |
| 11,351,979 | B2 | 6/2022 | Richter et al. | |
| 2001/0003393 | A1 * | 6/2001 | Cooper | B62D 59/04 280/411.1 |
| 2004/0065490 | A1 * | 4/2004 | Saito | B60L 3/003 180/65.23 |
| 2009/0171523 | A1 * | 7/2009 | Luo | F16D 48/02 180/65.23 |
| 2009/0265065 | A1 * | 10/2009 | Ikari | F02D 29/02 701/50 |
| 2011/0278822 | A1 * | 11/2011 | Lungershausen | B60D 1/485 280/495 |
| 2012/0116617 | A1 * | 5/2012 | Schaffler | B61C 15/08 701/20 |
| 2012/0130578 | A1 * | 5/2012 | Whitfield | B60L 50/10 298/17 R |
| 2013/0076497 | A1 | 3/2013 | Sheidler et al. | |
| 2013/0079979 | A1 | 3/2013 | Sheidler et al. | |
| 2013/0079980 | A1 | 3/2013 | Vuk et al. | |
| 2013/0259620 | A1 * | 10/2013 | Shirao | E02F 9/2296 701/50 |
| 2015/0051760 | A1 * | 2/2015 | Worden | E01H 8/105 701/19 |
| 2015/0246674 | A1 * | 9/2015 | Weston | B60K 23/04 701/87 |
| 2016/0122977 | A1 * | 5/2016 | Enomoto | E02F 3/42 701/50 |
| 2017/0129558 | A1 * | 5/2017 | Gugel | B60W 10/06 |
| 2017/0137004 | A1 * | 5/2017 | Suzuki | B60T 8/175 |
| 2019/0256097 | A1 | 8/2019 | Watt et al. | |
| 2020/0269706 | A1 | 8/2020 | Vande Haar et al. | |
| 2021/0129829 | A1 | 5/2021 | McKinzie et al. | |

FOREIGN PATENT DOCUMENTS

| | | |
|---|---|---|
| EP | 1818245 A1 | 8/2007 |
| EP | 3480047 A1 | 5/2019 |
| EP | 3199433 B1 | 12/2019 |

OTHER PUBLICATIONS

German Search Report issued in application No. 102020212211.3, dated Jul. 22, 2021, 10 pages.
Hyliion Hybrid Trailer Tandem Adds Drive Power, <URL: https://www.constructionequipment.com/field-tesVarticle/10752837/hyliion-hybrid-trailer-tandem-adds-drive-power>, dated Jan. 20, 2017, retrieved Oct. 3, 2023, 5 pages.
Test Drive Shows the Hyliion Trailer Hybrid Works, <URL: https://www.truckinginfo.com/159760/test-drive-shows-the-hyliion-trailer-hybrid-works>, dated Aug. 19, 2016, retrieved Oct. 3, 2023, 15 pages.
Hydraulic Drive Technology, SAF Holland Group, <URL: https://safholland.com/GB/en/technology/technologyCategory/trailer-axles-suspensions/hydraulic-drive>, retrieved Oct. 3, 2023, 4 pages.
Hydraulic Drive Technology-2, SAF Holland Group, <URL: https://safholland.com/GB/en/technology/technologyCategory/trailer-axles-suspensions/hydraulic-drive>, retrieved Oct. 3, 2023, 4 pages.

* cited by examiner

TRAILING VEHICLE TRACTION CONTROL SYSTEM WITH FORCE INCREASE CONTROL

CROSS-REFERENCE TO RELATED APPLICATIONS

This application claims the benefit of U.S. Provisional Patent Application No. 62/928,940, filed Oct. 31, 2019, which is hereby incorporated by reference in its entirety.

FIELD OF THE DISCLOSURE

The present disclosure relates to trailing vehicle traction control systems providing tractive force to the axles or wheels of trailing or towed vehicles.

BACKGROUND

Work vehicles may include a power source to provide power to a trailing or towed vehicle traction control system. Work vehicles may pull or tow one or more trailing vehicles behind the work vehicle. The work vehicle may encounter demanding situations due to the weight of the trailing vehicles, the terrain conditions, or both, which may result in decreased traction between the work vehicle and the ground surface.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes a traction control system having a force increase control which provides additional tractive force to the ground engaging apparatus of a trailing vehicle.

According to an aspect of the present disclosure, a traction control system for a trailing vehicle includes an electric machine, a ground engaging apparatus in contact with a ground surface, a speed sensor measuring the speed of the ground engaging apparatus, and a controller providing a traction control signal to the electric machine. The controller is in communication with a force increase control. The controller provides a temporary increase in tractive force of the electric machine when the force increase control is either manually or automatically activated. The amount of temporary increase in the tractive force can be variable and adjustable.

According to an aspect of the present disclosure, a traction control system for a vehicle train includes a work vehicle having a power source and a trailing vehicle connected to the work vehicle. The trailing vehicle has one or more ground engaging apparatus in contact with a ground surface. An electric machine coupled to the one or more ground engaging apparatus. A speed sensor measures the speed of trailing vehicle. A controller provides a traction control signal to the electric machine. The controller is in communication with a force increase control. The controller provides a temporary increase in tractive force of the electric machine when the force increase control is activated. The amount of temporary increase in the tractive force can be variable and adjustable.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

The embodiments disclosed in the above drawings and the following detailed description are not intended to be exhaustive or to limit the disclosure to these embodiments. Rather, there are several variations and modifications which may be made without departing from the scope of the present disclosure.

Figure 1:
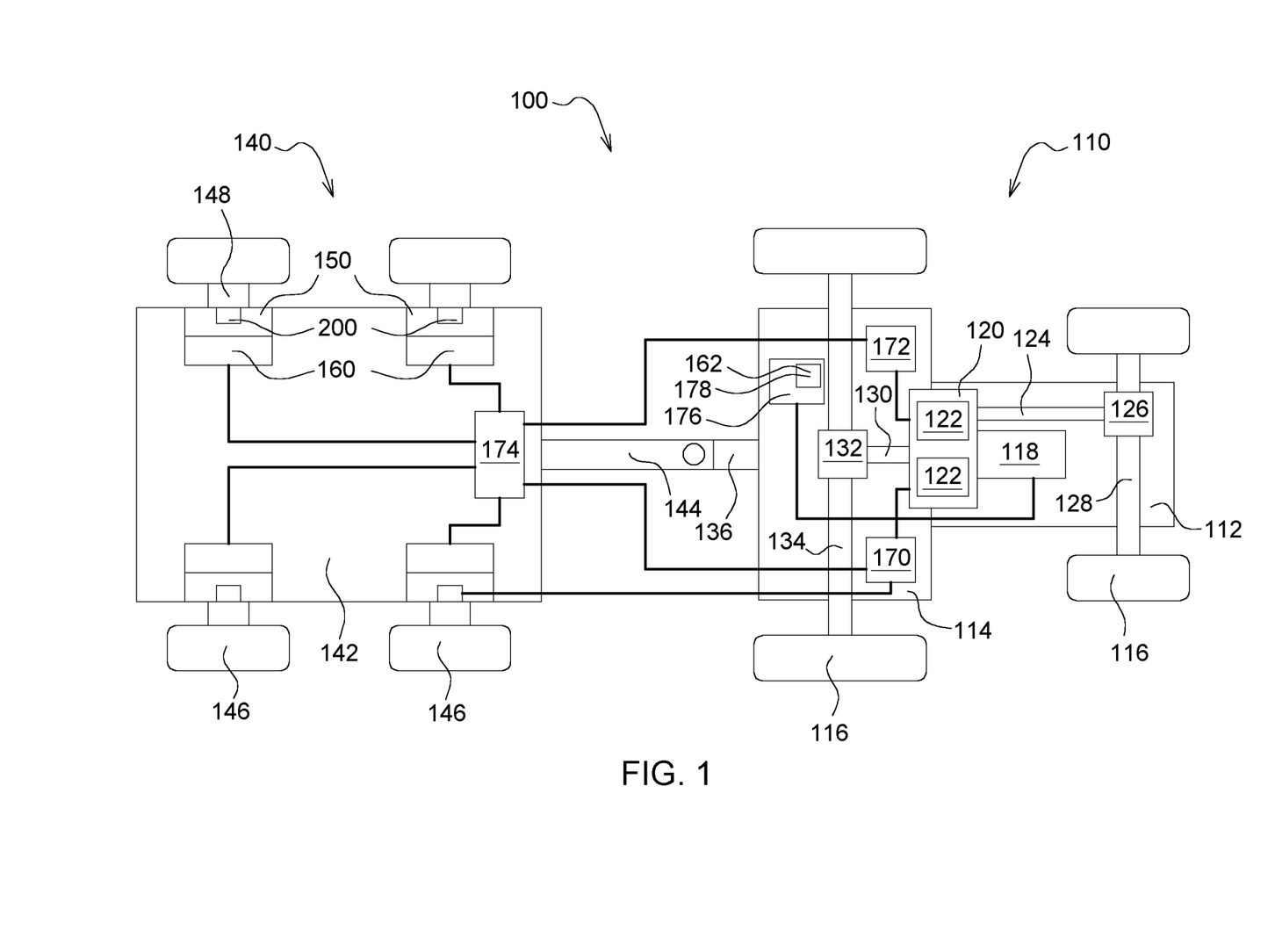
FIG. 1 is a schematic diagram of a traction control system, according to an embodiment.
Figure 2:
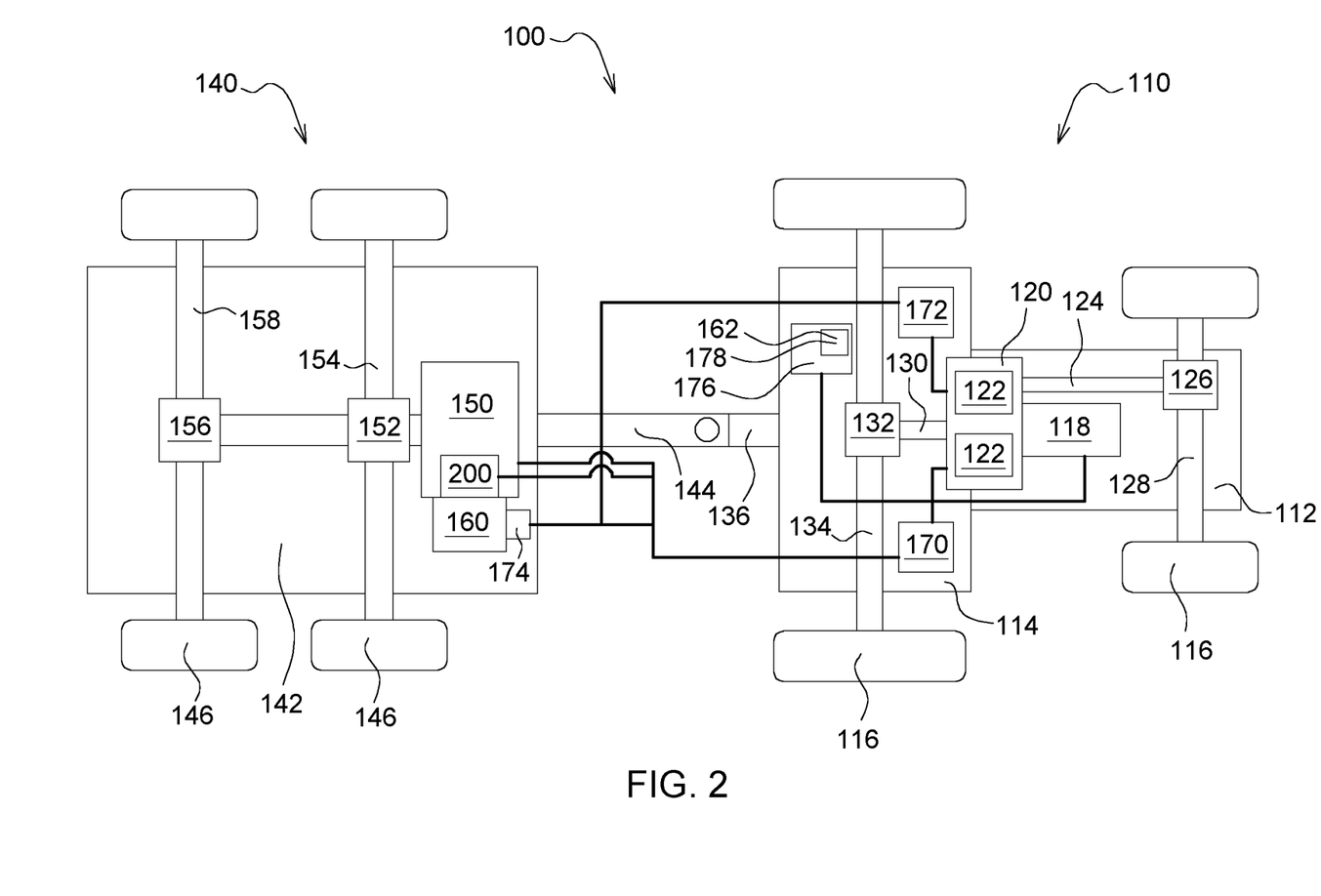
FIG. 2 is a schematic diagram of a traction control system, according to an embodiment.

FIGS. 1 and 2 illustrates a traction control system 100 for a tow vehicle 110 and a towed or trailing vehicle 140. Two or more vehicles connected to one another can be referred to a vehicle train. The tow vehicle 110 can be any work vehicle such as an agricultural tractor for example ("vehicle"). The towed or trailing vehicle 140 can be any agricultural, construction, forestry, or road building equipment such as an implement or trailer pulled or towed behind an agricultural tractor for example ("trailer"). The vehicle 110 includes a frame structure or chassis 112 and an operator station or cab 114 where a machine operator may control the operation of the vehicle 110 or the trailer 140. The vehicle 110 includes one or more ground engaging apparatus 116, for example wheels or tracks. The vehicle includes a power source 118, for example an internal combustion engine or another energy source such a battery for example. The vehicle 110 includes a transmission 120, which connects or couples the power source 118 to one or more ground engaging apparatus 116 via one or more the following drivetrain components: a front drive shaft 124, a front gear set or differential 126, a front axle or axles 128, a rear drive shaft 130, a rear gear set or differential 132, and a rear axle or axles 134. The transmission 120 can include a variety of gear sets and gearing and one or more electric machines 122, such as motor-generator for example. The transmission 120 can be an infinitely or continuously variable transmission with multiple motor-generators 122 coupled to one or more gear sets, such as an epicyclic gear sets for example. The motor-generator 122 can either drive one or more gears within the transmission 120 or be driven to produce electric energy. The vehicle 110 includes a hitch or drawbar 136 used to connect or couple the vehicle 110 to the hitch or drawbar 144 of the trailer 140.

The trailer 140 includes a frame structure or chassis 142 and one or more ground engaging apparatus 146, such as wheels or tracks. The trailer 140 includes one or more axles 148, which may include a gear set such as a final drive or reduction gear set. The trailer 140 can include one or more transmissions or gear sets 150 positioned between one or more electric machines 160 and the axles 148 or the ground engaging apparatus 146. The electric machine 160 can be any type of electric motor. A disconnect device 200, such as a clutch 200, can be positioned between any two of the following components: the electric machine 160, the transmission 150, the axles 148, 154, 158, and the ground engaging apparatus 146. The clutch 200 can be positioned between the transmission 150 and the axles 148. The clutch 200 can engage and disengage the electric machine 160 from the ground engaging apparatus 146. The clutch 200 can be engaged and disengaged by hydraulic, pneumatic, or electric control. The clutch 200 can be engaged and disengaged by a solenoid. The one or more electric machines 160 can be directly connected to the axles 148 or to the ground engaging apparatus 146. Alternatively, the trailer 140 can include an electric machine 160 coupled to a transmission 150, which is coupled to the one or more ground engaging apparatus 146 via one or more of the following drivetrain components: a front differential 152, a front axle or axles 154, a rear differential 156, a rear axle or axles 158, and drive shafts connecting the transmission 150 with the differentials 152, 156.

Figure 3:
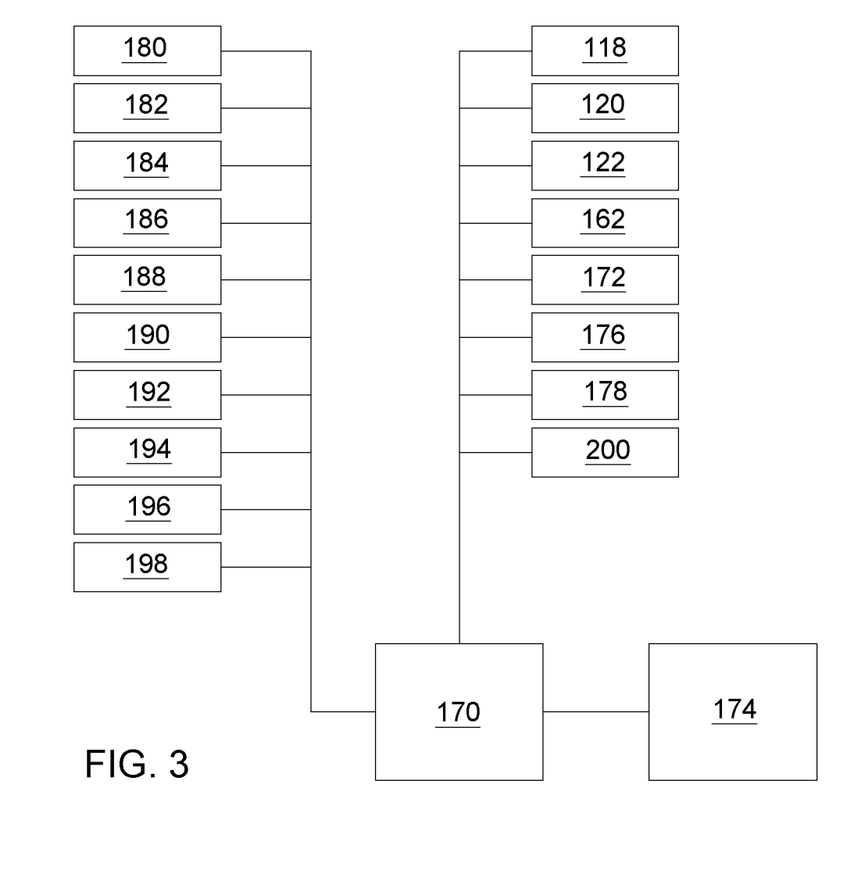
FIG. 3 is a schematic diagram of an electronic control system of a traction control system, according to an embodiment.

With reference to FIGS. 1-3, the traction control system 100 includes an electronic control unit 170, or controller, having one or more microprocessor-based electronic control units or controllers, which perform calculations and comparisons and execute instructions. The controller 170 includes a processor, a core, volatile and non-volatile memory, digital and analog inputs, and digital and analog outputs. The controller 170 can include non-transitory, computer readable memory, such as random-access memory (RAM), read only memory (ROM), or electrically erasable programmable read only memory (EEPROM), which include instructions for execution by the processor. The controller 170 connects to and communicates with various input and output devices including, but not limited to, switches, relays, solenoids, actuators, light emitting diodes (LED's), passive and interactive displays, radio frequency devices (RFD's), sensors, and other controllers. The controller 170 receives communications or signals, via electrically or any suitable electromagnetic communication, from one or more devices, determines an appropriate response or action, and sends communications or signals to one or more devices. The controller 170 can be a microprocessor, an application specific integrated circuit (ASIC), a digital processor, or a programmable logic controller, also known as a PLC or programmable controller.

The controller 170 can connect to and communicate with the vehicle 110 electronic control system through a data bus, such as a CAN bus, or the controller 170 can be a part of the vehicle 110 electronic control system. The traction control system 100 can include a second controller 174 connected to the trailer 140 electronic control system. The traction control system 100 can include a power electronic device 172, such as an inverter, converter, or rectifier. The traction control system 100 can include an operator interface 176 having any number and combination of electronic devices, such as an interactive display. The operator interface 176 can include an operator input 178 providing input to the electronic control systems. The operator input 178 can include one or more of the following: an actual or virtual button, switch, slider, knob, dial, adjustment, or other control mechanism. The operator input 178 can provide specific instructions to the electronic control systems. The operator input 178 can include a tractive force increase control 162, or just force increase control, in the form of an actual or virtual button, switch, slider, knob, dial, adjustment, or other control mechanism. The operator can request a tractive force increase by selecting the force increase control 162. Alternatively, or additionally, the operator can request a variable and adjustable force increase amount via a gain adjustment of the force increase control 162. The force increase control 162 can remain active while the operator continues to engage the force increase control 162. For the gain adjustment, the tractive force increase can remain in place until the gain is reduced. The operator may need or request additional tractive force for a variety of conditions including, but not limited to, tight turning radius, poor traction conditions, steep terrain, and soft soil conditions.

The traction control system 100 can include a variety of sensors to measure speed, torque, direction, position, location, pitch, roll, and yaw, and other properties of the vehicle 110 and the trailer 140 including, but not limited to: a sensor 180 to measure the speed of the vehicle 110, a sensor 182 to measure the speed of the trailer 140, a sensor 184 to measure the output of the power source 118, a sensor 186 to measure the output of the transmission 120, a sensor 188 to measure the output or input of the motor-generators 122, a sensor 190 to measure the output of the electric machines 160, a sensor 192 to measure the state or condition of the clutch 200, and a sensor 194 to measure the pitch, roll, and yaw of the vehicle 110, trailer 140, or both. The controller 170 or 174 can determine the slope of the terrain from the sensor 194. These sensors can be any type of sensors capable of measuring or detecting the respective property. The controller 170 can connect to and communicate with the variety of sensors listed above, the power source 118, the transmission 120, the one or more motor-generators 122, the force increase control 162, the power electronic device 172, the controller 174, the operator interface 176, and the operator input 178.

Figure 4:
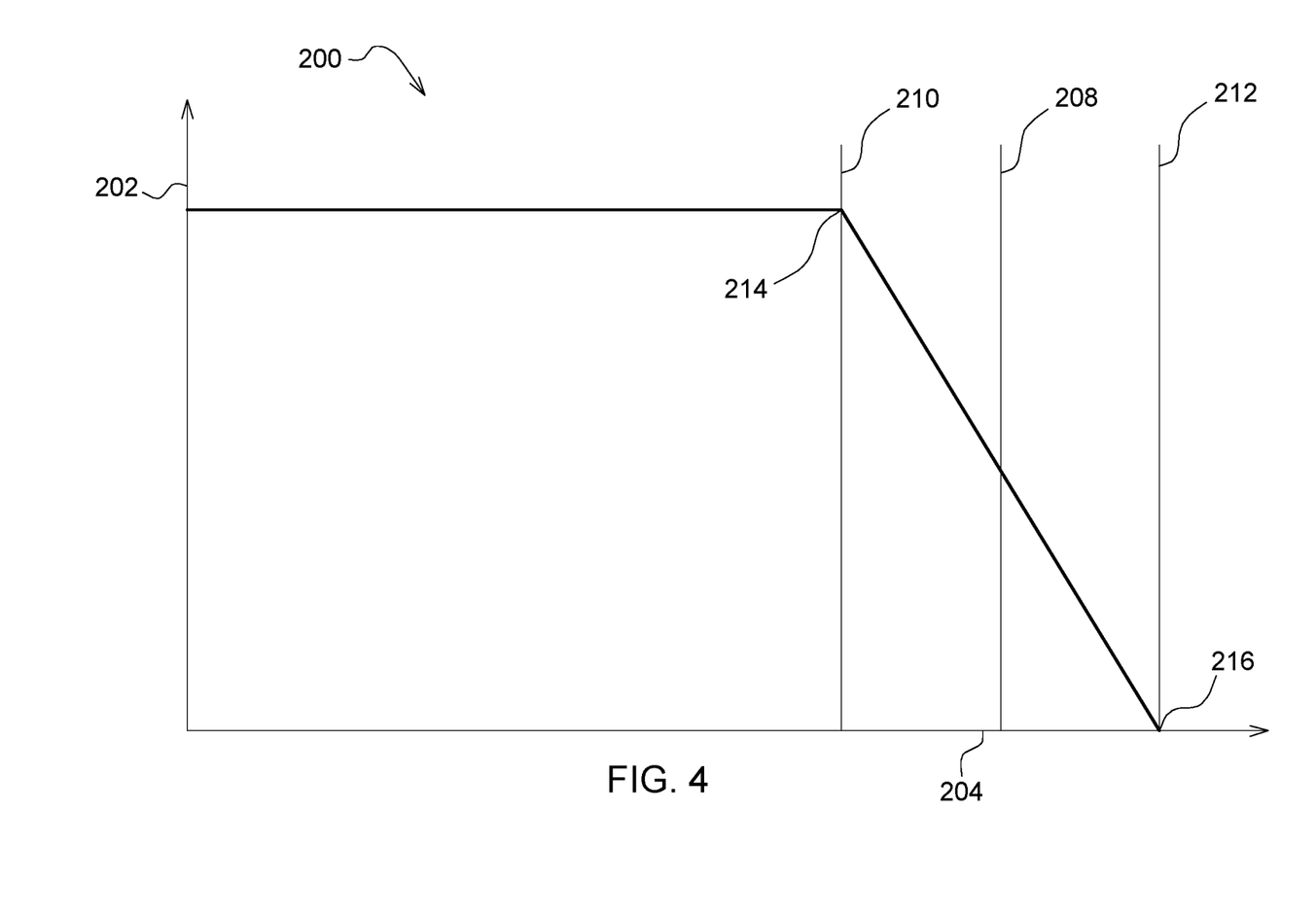
FIG. 4 is a chart of tractive force provided to a trailing vehicle based upon the trailing cart speed, according to an embodiment.

With reference to FIG. 4, a tractive force graph 200 illustrates the tractive force 202 (y-axis) provided by the traction control system 100 to the trailer 140 based upon the actual speed 204 (x-axis) of the trailer 140 during normal operation. The y-axis is the tractive force 202, tractive force or effort in kN. The x-axis 204 is the actual speed 204 of the trailer 140. The tractive force curve 206, or just force curve 206, shows the tractive force provided to the trailer 140 based upon the actual speed 204 of the trailer 140. The tractive force can be provided to the one or more electric machines 160 for example. The target or specified speed 208 of the trailer 140 is shown as a vertical line on the graph. The target or specified speed 208 can be the speed of the vehicle 110. The lower speed limit 210 of the trailer 140 is shown as a vertical line at a slower speed than the target speed 208.

The upper speed limit 212 is shown as a vertical line a higher speed than the target speed 208. The force curve 206 is shown as a straight line between the intersection point 214 of the force curve 206 and the lower speed limit 210 and the intersection point 216 of the upper speed limit 212 and the x-axis 204, or zero tractive force. When the trailer 140 is traveling below the lower speed limit 210, the amount of tractive force provided to the trailer 140 between the lower speed limit 210 and zero speed is constant. Alternatively, the force curve 206 between zero speed and the lower speed limit 210 can be a line having a slope so that the tractive force varies from zero speed to the lower speed limit 210. When the trailer 140 is traveling at a speed between the lower speed limit 210 and the upper speed limit 212, the force curve 206 slopes downwardly from a set force level at the lower speed limit 210 to zero force at the upper speed limit 216. When the trailer 140 is traveling at a speed above the upper speed limit 212, then the tractive force 202 is zero.

The controller 170 or 174 monitors various inputs from the vehicle 110 and trailer 140 including but not limited to: power source 118 load, transmission 120 load, vehicle 110 speed, radar speed, trailer ground engaging apparatus 146 speed, angle between the trailer 140 and vehicle 110, and the pitch of the trailer 140 and tractor 110. These inputs are used to determine the speed torque curve command for the electric machine 160 and the power limits of the electric machine 160. During normal operation, the controller 170 174 seeks to shift the force curve 206 to the left and reduce the tractive force provided by the electric machine 160 the ground engaging apparatus 146.

Figure 5A:
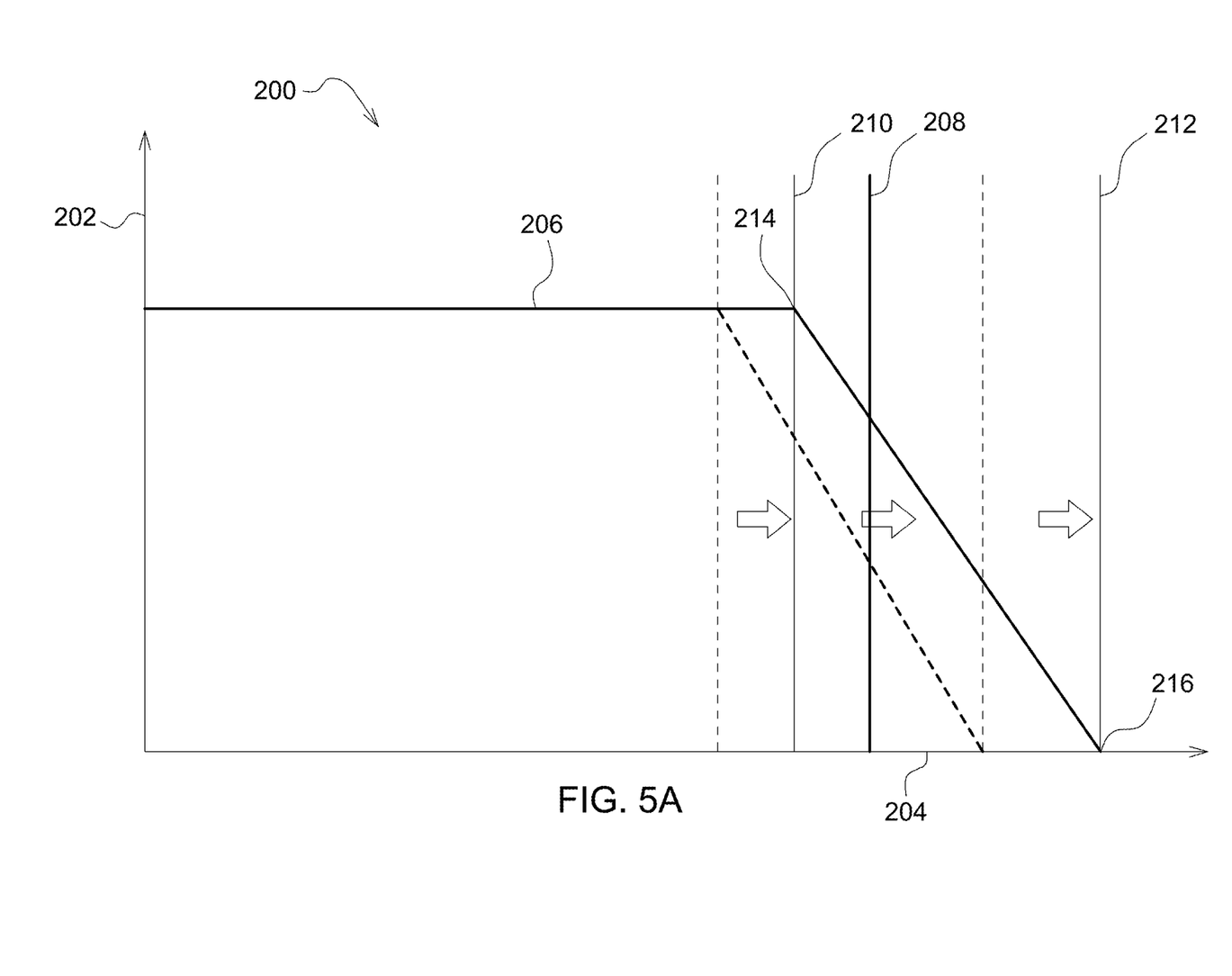
FIG. 5A is a chart of tractive force provided to a trailing vehicle based upon the trailing cart speed, according to an embodiment.
Figure 5B:
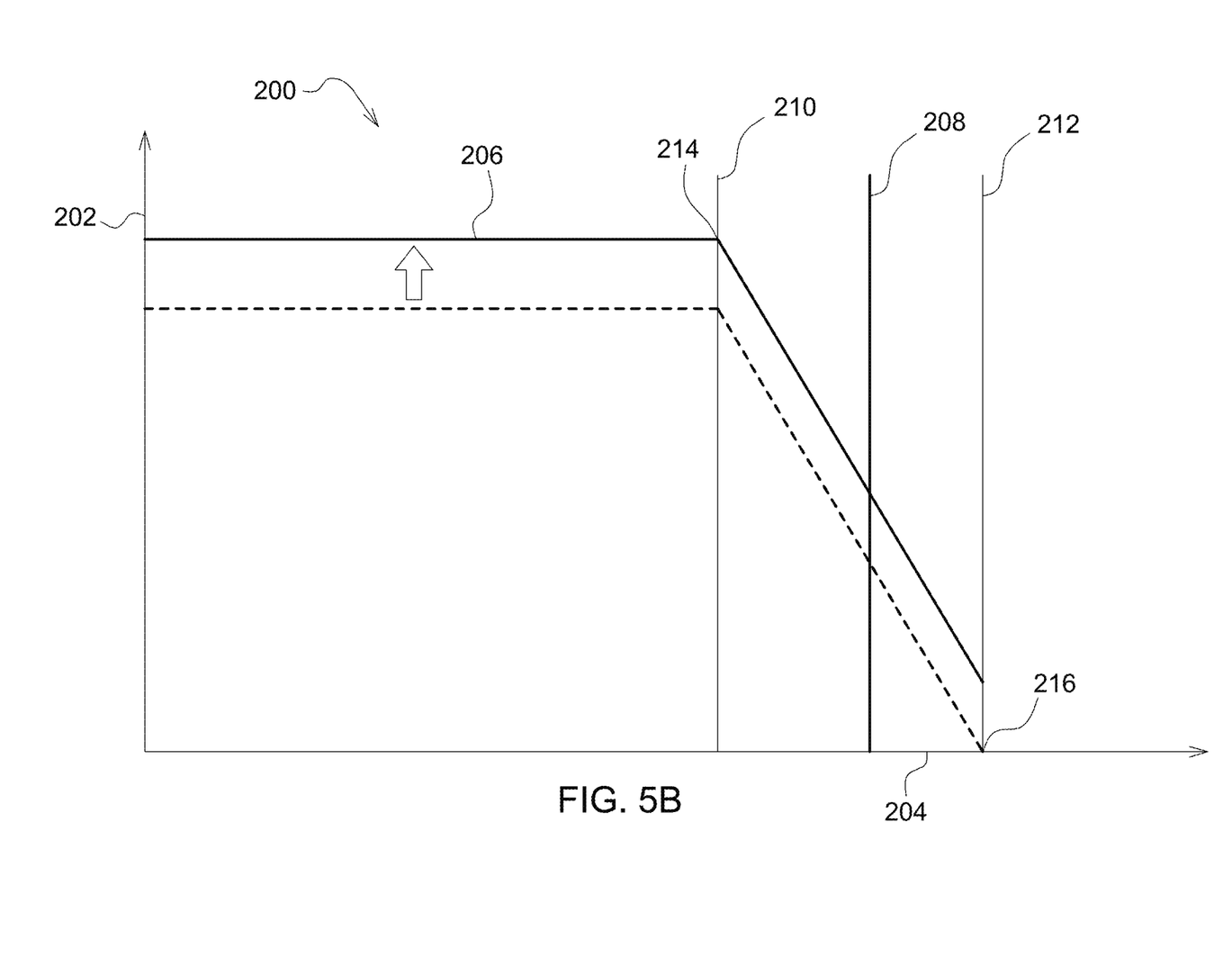
FIG. 5B is a chart of tractive force provided to a trailing vehicle based upon the trailing cart speed, according to an embodiment.
Figure 5C:
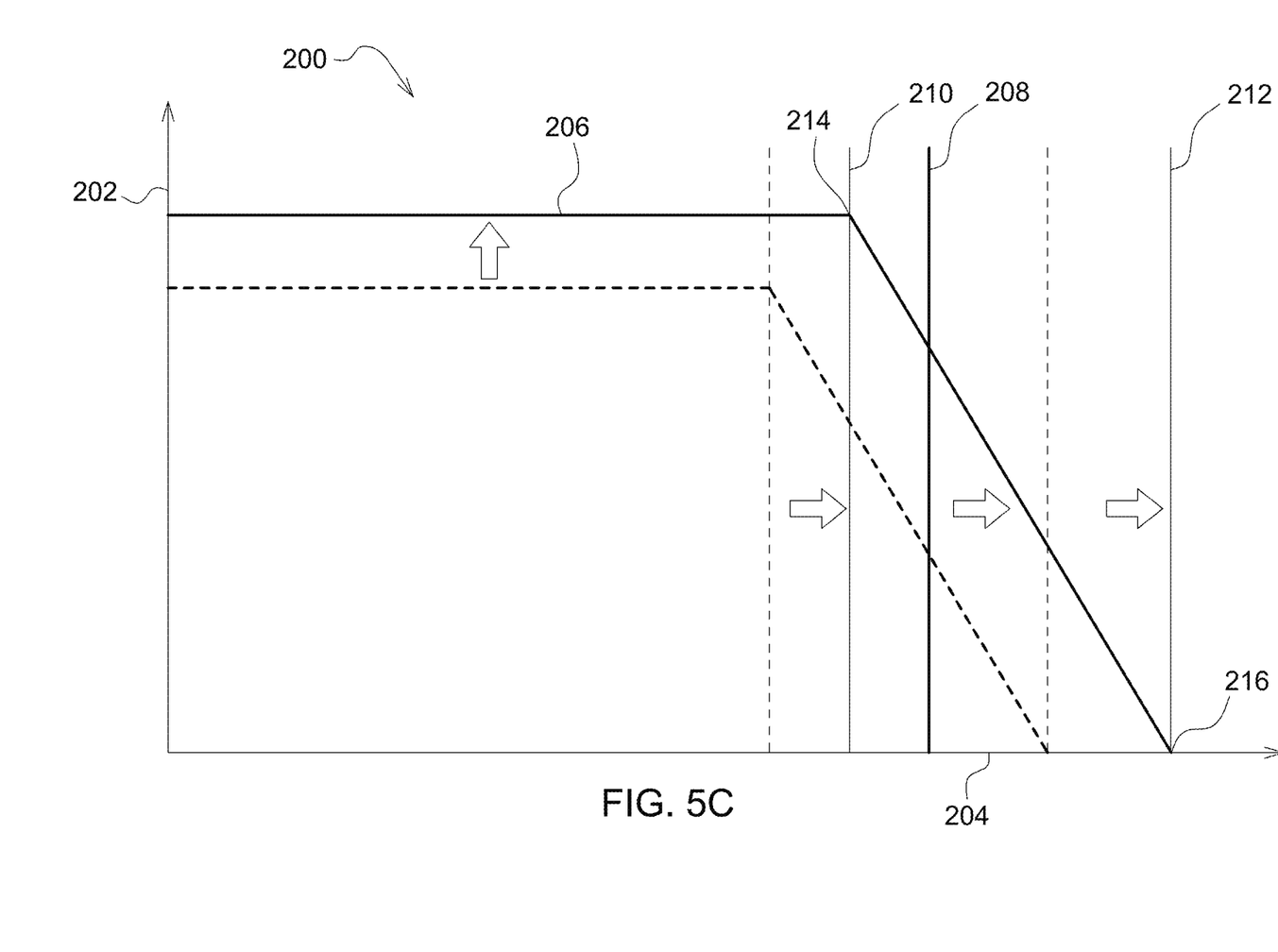
FIG. 5C is a chart of tractive force provided to a trailing vehicle based upon the trailing cart speed, according to an embodiment

With reference to FIGS. 5A, 5B, and 5C, a tractive force graph 200 illustrates the tractive force 202 provided by the traction control system 100 to the trailer 140 (y-axis) based upon the actual speed 204 of the trailer 140 (x-axis). When the force increase control 162 is activated, the lower and upper speed limits 210, 212 are shifted to the right, which also shifts the force curve 206 to the right, as shown in FIG. 5A. Alternatively as shown in FIG. 5B), or additionally as shown in FIG. 5C), the force curve 206 can also be shifted vertically. The result of the force curve 206 moving to the right as shown in FIG. 5A), or moving upward (as shown in FIG. 5B) or both as shown in FIG. 5C), is increased tractive force levels for the actual speed of the trailer 140 between the lower and upper speed limits 210, 212. For any given speed of the trailer 140 between the lower and upper speed limits 210, 212, more tractive force 202 is provided while the force increase control 162 is active. The force increase control 162 can be activated and remain active for a set or specific amount of time. The force increase control 162 can be activated and remain active while an operator presses an actual or virtual button or switch until the operator releases the button or switch or maximum amount of time has been reached. The force increase control 162 can be an on/off selection or a gain selection which allows a plurality of selections between a minimum gain and a maximum gain with a slider or dial for example. The force increase control 162 can also be a combination of an on/off selection and a gain adjustment for a variable amount of increase in tractive force.

The force increase control 162 can have activation or time limits to prevent the force increase control 162 from being continuously active. For example, the force increase control 162 may be limited by how many times it can be activated with a specific amount of time; or the force increase control 162 may be limited by how much time it can be active over a total elapsed or specified period of time (percent of time active). For example, the force increase control 162 may be limited by the number of activations per unit of time of operation of the electric machine; or the force increase control 162 may be limited by a maximum percentage of time active. Alternatively, or additionally, the force increase control 162 can have operational limits, such as a heat or maximum temperature limit, power limit, torque limit, or speed limit of the electric machine 160.

Figure 6:
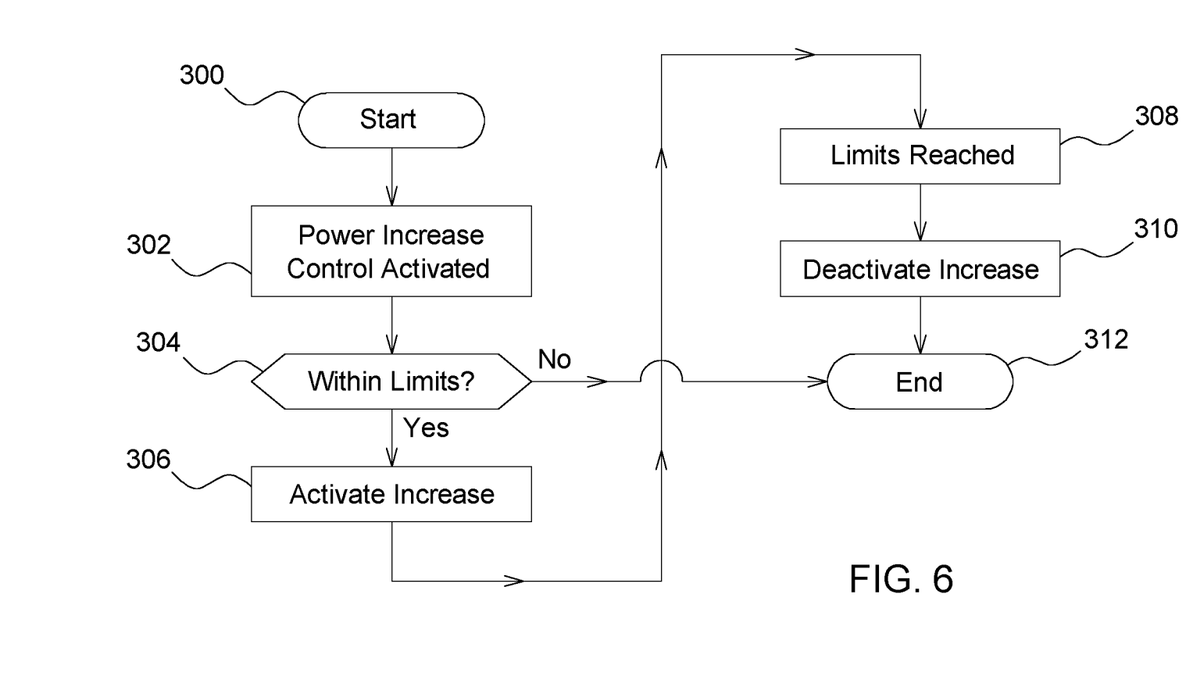
FIG. 6 is a flow diagram for a method of activating a force increase control in a traction control system, according to an embodiment.

FIG. 6 illustrates a method of activating a force increase control 162 in a traction control system 100, which may be implemented in one or more of the embodiments described herein and depicted in the various FIGURES. At step 300, the method starts.

At step 302, the force increase control 162 activation is requested, either manually by an operator or automatically by control apparatus or methods. An operator can request a tractive force increase by selecting the force increase control 162.

At step 304, the traction control system 100, via a controller 170 or 174, determines whether the number of activations or the percent of time active of the force increase control 162 is within acceptable limits. If the either the number of activations or the percent of time active exceeds the acceptable limits, then the force increase control 162 is not activated and the method ends. Alternatively, or additionally, the controller 170 or 174 can determine any operational limits, such as the temperature, power, torque, or speed of the electric machine 160. A message or indicator can be displayed to the operator to indicate that the force increase control 162 was not activated due to any or all of the activation limitations. Alternatively, the force increase control 162 can be deactivated when the limits are reached so that activation of the force increase control 162 cannot be requested until the number of activations and percent time active is within acceptable limits. If both the number of activations and the percent of time active are within the acceptable limits, then the method proceeds to step 306.

At step 306, the force increase control 162 is activated and additional electrical power is provided to the one or more electric machines 160 on the trailer 140 to provide more tractive force to the ground engaging apparatus. The method then proceeds to step 308.

At step 308, the force increase control 306 remains active until a specific amount of time has elapsed. Alternatively, the traction control system 100 could keep the force increase control active until the one or more electric machines 160 exceed specific operational limits, such as temperature, or power consumption, power or torque levels, or speed. Once the time limits or other operational limits have been reached, such as maximum temperature, power, torque, or speed of the electric machine 160, the method proceeds to step 310.

At step 310, the force increase control 162 is deactivated and the lower and upper speed limits 210, 212 shift left back to their original positions for normal operations. The traction control system 100 records the amount of time the force increase control 162 was active and other operational parameters.

At step 312, the method of activating a force increase control 162 in a traction control system 100 is complete, according to one embodiment. In other embodiments, one or more of these steps or operations may be omitted, repeated, or re-ordered and still achieve the desired results.

Without in any way limiting the scope, interpretation, or application of the claims appearing below, a technical effect of one or more of the example embodiments or implementations disclosed herein is a traction control system having a force increase control to provide additional tractive force to the ground engaging apparatus on the trailing vehicle via the electric machines. The force increase control provides a temporary increase in tractive force of the electric machine on the trailing vehicle. The operator of the work vehicle can request this temporary increase in tractive force on demand. The operator can set the amount of temporary increase from a minimum increase to a maximum increase.

The terminology used herein is for describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A traction control system for a trailing vehicle comprising:
    an electric machine;
    a ground engaging apparatus in contact with a ground surface;
    a speed sensor measuring a speed of the ground engaging apparatus; and
    a controller configured to provide a first traction control signal to the electric machine for a first tractive force at the speed of the ground engaging apparatus during normal operation, the controller configured to provide a second traction control signal to the electric machine for an increased second tractive force at the speed of the ground engaging apparatus when the force increase control is activated and the speed of the ground engaging apparatus is between a lower speed limit greater than zero speed and an upper speed limit, and the controller configured to provide the first traction control signal to the electric machine for the first tractive force at the speed of the ground engaging apparatus when the force increase control is activated but the speed of the ground engaging apparatus is below the lower speed limit.

2. The traction control system of claim 1, wherein the force increase control is activated for a specific amount of time.

3. The traction control system of claim 1, wherein the force increase control can request a variable amount of the increased second tractive force, including a gain adjustment having a plurality of selections between a minimum gain and a maximum gain.

4. The traction control system of claim 1, wherein the amount of time the force increase control is activated is limited by a maximum percentage of time active.

5. The traction control system of claim 1, wherein the amount of time the force increase control is activated is limited by one or more of a temperature, power, torque, and speed of the electric machine.

6. The traction control system of claim 3, wherein activation of the force increase control can be requested by an operator via an on/off selection and the gain adjustment for the variable amount of the increased second tractive force.

7. The traction control system of claim 1, wherein activation of the force increase control is an operator input and the force increase control remains active while the operator input is engaged.

8. A traction control system for a vehicle train comprising:
    a work vehicle having a power source;
    a trailing vehicle connected to the work vehicle, the trailing vehicle having one or more ground engaging apparatus in contact with a ground surface;
    an electric machine coupled to the one or more ground engaging apparatus;
    a speed sensor measuring the speed of trailing vehicle; and
    a controller configured to provide a first traction control signal to the electric machine for a first tractive force at the speed of the ground engaging apparatus during normal operation, the controller configured to provide a second traction control signal to the electric machine for an increased second tractive force at the speed of the ground engaging apparatus when the force increase control is activated and the speed of the ground engaging apparatus is between a lower speed limit greater than zero speed and an upper speed limit, and the controller configured to provide the first traction control signal to the electric machine for the first tractive force at the speed of the ground engaging apparatus when the force increase control is activated but the speed of the ground engaging apparatus is below the lower speed limit.

9. The traction control system of claim 8, wherein the force increase control is activated for a specific amount of time.

10. The traction control system of claim 8, wherein the force increase control can request a variable amount of the increased second tractive force, including a gain adjustment having a plurality of selections between a minimum gain and a maximum gain.

11. The traction control system of claim 8, wherein the amount of time the force increase control is activated is limited by a maximum percentage of time active.

12. The traction control system of claim 8, wherein the amount of time the force increase control is activated is limited by one or more of a temperature, power, torque, and speed of the electric machine.

13. The traction control system of claim 10, wherein activation of the force increase control can be requested by an operator via an on/off selection and the gain adjustment for the variable amount of the increased second tractive force.

14. The traction control system of claim 8, wherein activation of the force increase control is an operator input and the force increase control remains active while the operator input is engaged.

15. A method of activating a force increase control in a traction control system for a trailing vehicle, comprising:
    providing via an electric machine a first tractive force to one or more ground engaging apparatus;
    requesting a tractive force increase via the force increase control from the first tractive force to a second tractive force at a specified speed;
    determining via a controller whether the number of activations and the percent of time active of the force increase control are within acceptable limits;
    activating the force increase control via the controller when both the number of activations and the percent of time active are within the acceptable limits;
    providing additional electrical power via the controller to one or more electric machines on the trailing vehicle when the force increase control is activated and the speed of the ground engaging apparatus is between a lower speed limit greater than zero speed and an upper speed limit resulting in the tractive force increase to the one or more ground engaging apparatus on the trailing vehicle from the first tractive force to the second tractive force at the specified speed;
    providing the same electrical power via the controller to one or more electric machines on the trailing vehicle when the force increase control is activated but the speed of the ground engaging apparatus is below the lower speed limit resulting in the same tractive force to the one or more ground engaging apparatus on the trailing vehicle;
    deactivating the force increase control via the controller when a specific amount of time has elapsed; and
    recording via the controller the amount of time the force increase control was active.

16. The method of claim 15, further comprising:
    displaying an indicator via an operator interface when the force increase control was not activated because either the number of activations or the percent of time active exceeds the acceptable limits.

17. The method of claim 15, further comprising:
    determining via the controller whether one or more of a temperature, power, torque, and speed of the electric machine are within specific operational limits; and
    displaying an indicator via an operator interface when one or more of the temperature, power, torque, and speed of the electric machine exceed the specific operational limits.

18. The method of claim 17, further comprising:
    deactivating the force increase control via the controller when the one or more of the temperature, power, torque, and speed exceed the specific operational limits.

19. The method of claim 17, further comprising:
    deactivating the force increase control via the controller when one or more of the temperature, power, torque, and speed exceed maximum operational limits.

20. The method of claim 17, further comprising:
    recording via the controller one or more of the temperature, power, torque, and speed of the electric machine.

21. The traction control system of claim 1, wherein the controller shifts a tractive force curve when the force increase control is activated so that for each speed of the ground engaging apparatus between the lower speed limit and the upper speed limit the electric machine provides additional tractive force compared to when the force increase control is deactivated and for each speed of the ground engaging apparatus below the lower speed limit the electric machine provides the same tractive force compared to when the force increase control is deactivated.

22. The traction control system of claim 8, wherein the controller shifts a tractive force curve when the force increase control is activated so that for each speed of the ground engaging apparatus between the lower speed limit and the upper speed limit the electric machine provides additional tractive force compared to when the force increase control is deactivated and for each speed of the ground engaging apparatus below the lower speed limit the electric machine provides the same tractive force compared to when the force increase control is deactivated.

23. The method of claim 15, further comprising:
    shifting via the controller a tractive force curve when the force increase control is activated so that for each speed of the ground engaging apparatus between the lower speed limit and the upper speed limit the electric machine provides additional tractive force compared to when the force increase control is deactivated and for each speed of the ground engaging apparatus below the lower speed limit the electric machine provides the same tractive force compared to when the force increase control is deactivated.

* * * * *